Oct. 24, 1933.    F. P. LIVINGSTON    1,932,079
SAFETY CAR CONTROL EQUIPMENT
Filed July 31, 1930
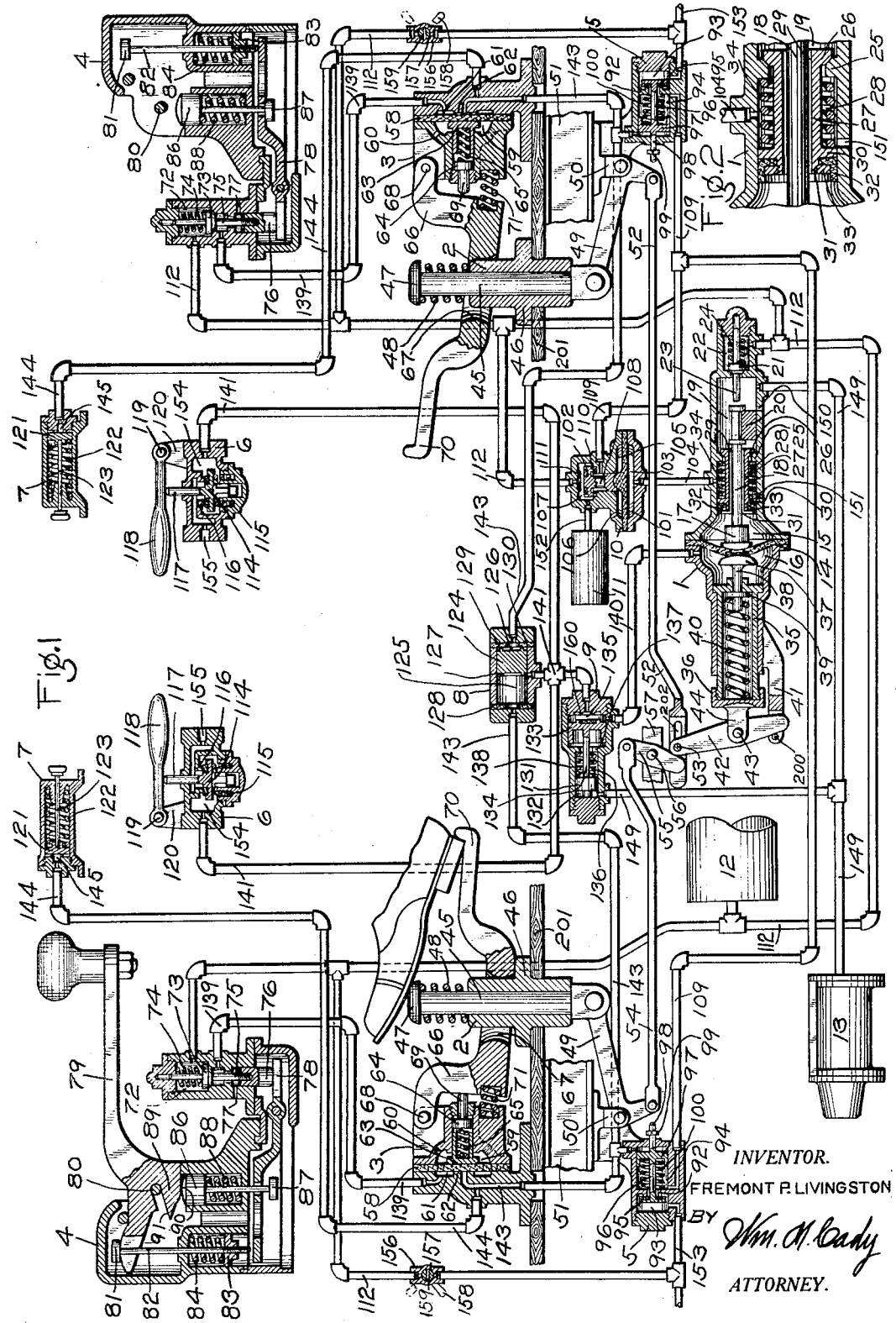
INVENTOR.
FREMONT P. LIVINGSTON
BY Wm. H. Cady
ATTORNEY.

Patented Oct. 24, 1933

1,932,079

UNITED STATES PATENT OFFICE 1,932,079

SAFETY CAR CONTROL EQUIPMENT

Fremont P. Livingston, Denver, Colo., assignor to The Westinghouse Air Brake Company, Wilmerding, Pa., a corporation of Pennsylvania Application July 31, 1930. Serial No. 471,948

37 Claims. (Cl. 303—19)

This invention relates to fluid pressure brakes and more particularly to safety car control equipment in which the brakes are automatically applied if the operator becomes incapacitated.

The principal object of my invention is to provide an improved equipment of the above type in which only one brake control valve device is employed on a car, which device is adapted to be controlled from either end of the car by the pressure of an operator's foot and a hand operated power controller handle.

Other objects and advantages will appear in the following more detailed description of my invention.

In the accompanying drawing; Figure 1 is a diagrammatic view, partly in section, of a fluid pressure brake equipment embodying my invention; and Fig. 2 is an enlarged view of a portion of the brake control device shown in Fig. 1.

As shown in the drawing, the fluid pressure brake equipment is of the double ended type adapted to be operated from either end of a car and comprises a brake control device 1 disposed intermediate the ends of the car, and adapted to be controlled from either end of said car by the operation of a foot operated plunger device 2 or the interlocked operation of a foot operated safety control device 3 and hand operated power controller and safety control device 4. The equipment further comprises a sanding valve device 5, an emergency release valve device 6 and a circuit breaker device 7 at each end of the car, and intermediate said ends is disposed a double check valve device 8, a cut-off valve device 9, a sanding reservoir control valve device 10, a sanding reservoir 11, a main reservoir 12 and a brake cylinder 13.

The brake control device 1 comprises a casing containing a flexible diaphragm 14 having at one side a chamber 15 and at the other side a chamber 16. Disposed in the chamber 15 and secured to said diaphragm is a follower member 17 having a stem 18 extending into a chamber 19 for operating an exhaust valve 20. An application valve 21 is disposed in a chamber 22 and is provided with a stem 23 adapted to be engaged by the diaphragm follower stem 18 for unseating said valve, a spring 24 being provided in chamber 22 to urge the valve 21 to its seat.

The casing is provided with an annular rib 25 which separates chamber 19 from a bore 28 in the casing, said rib forming a seat for a valve 26 provided on the end of a sleeve-like member 27 disposed in said bore. The sleeve-like member has a central bore 29 through which the diaphragm follower stem 18 freely extends and which also provides communication between chambers 15 and 19.

The left hand end of the sleeve-like member 27 is provided with an enlarged flange portion 30 and a screw-threaded extension 31. A packing cup 32 is mounted on said sleeve in the bore 28 of the casing and leak proof engagement is maintained between said cup and the flange 30 by a nut 33 mounted on the sleeve extension 31. A spring 34 is interposed between the rib 25 and flange 30 for urging the valve 26 to its seat.

Slidably mounted in the casing and extending into chamber 16 is a plunger 35, the open end of which is closed by a cover 36 having screw-threaded engagement therewith. A diaphragm follower 37 is provided in chamber 16 and has a stem 38 extending into said plunger, wherein a spring seat 39 is provided on said stem. Interposed between said spring seat and the cover 36 is a spring 40 which is adapted to permit relative movement between said plunger and diaphragm follower.

Projecting from the casing is a bracket 41, the outer end of which is forked to receive one end of a lever 42, a pin 200 being provided in the end of the forked portion of the bracket to form a stop for said lever upon clockwise rotation. The lever 42 is pivotally mounted in a bracket 44 by a pin 43, said bracket projecting from the plunger cover 36.

The foot operated plunger device 2 comprises a plunger 45 slidably mounted in a pedestal 46 which may be secured to the car floor 201. The lower end of the plunger 45 is enlarged to form a stop against the lower face of the pedestal 46, while the upper end of said plunger is provided with a button shaped head 47 which is adapted to be engaged by the foot of an operator, as shown in the drawing. A spring 48 is interposed between the plunger head 47 and the top face of the plunger to oppose downward movement thereof by the operator's foot and to move said plunger to release position upon relief of pressure of the operator's foot.

The lower end of the plunger 45 is pivotally connected to one end of an L-shaped lever 49 which is pivoted on a bracket 50, preferably secured to a portion of the under-frame 51 of the car. The other end of the lever 49, at the non-operating end of the car, is connected by an operating rod 52 to the upper end of the brake control device lever 42 by means of a pin 53 extending through a slot in the enlarged flattened end of said rod. The other end of the lever 49 at the operating end of the car is connected by an operating rod 54 to a lever 55 which is pivoted on a pin 56 mounted in a bracket 57. The bracket 57 is fixed relative to the casing of the brake control device 1 in such a manner that the opposite end of the lever 55 is adapted to engage the upper end of lever 42 and under certain conditions is adapted to rotate the lever 42 in a clockwise direction, such rotation being permitted relative to the operating rod 52 due to the slot 202 formed in the end of the rod 52.

The safety control device 3 comprises a casing containing a diaphragm 58 having at one side a chamber 59 in communication with the atmosphere by way of a passage 60 and having at the opposite side a chamber 61, a seat rib 62 being formed in said casing adjacent the chamber 61 and adapted to be engaged by said diaphragm.

For operating the diaphragm 58, a follower member 63 is disposed in the chamber 59 in engagement with said diaphragm. A plunger 64 is provided in a bore in the casing and a spring 65 is interposed between the follower member 63 and plunger 64 for transmitting the movement of said plunger to the diaphragm 58.

A foot pedal 66, having a central opening 67 adapted to freely fit over the pedestal 46, is pivoted on a pin 68 in the casing and is adapted to engage an operating stem 69 of the plunger 64 for operating same. The pedal 66 is provided with a heel plate portion 70 adapted to be engaged by the heel of an operator's foot at the same time as the ball of the operator's foot engages the head portion 47 of the plunger 45. A spring 71 is interposed between the pedal 66 and the casing of the safety control device 3 for operating same in a counter-clockwise direction upon removal of the operator's foot pressure from the pedal 66.

The power controller and safety control device 4 comprises a casing having a chamber 72 containing a valve 73 and a spring 74 for urging said valve to its seat. The valve 73 has a stem 75 and secured to the lower end of said stem is a piston 76 slidably mounted in a suitable bore in the casing and adapted to control an atmospheric passage 77. A removable controller handle 79 is pivoted on a pin 80 in the casing and has a projection adapted to engage a head 81 on a plunger stem 82. The lower end of said stem is provided with a spring seat 83 having screw-threaded engagement with the stem. Interposed between the spring seat 83 and a wall of the casing is a spring 84 which is compressed when the controller handle 79 is held in its normal depressed position as shown in the drawing, but upon removal of pressure from the controller handle, the pressure of spring 84 shifts the plunger stem 82 downwardly. A lever 78 is pivoted in the casing and has one end engaging the piston 76 and the other end is disposed beneath the plunger stem 82 and is adapted to be engaged by said plunger stem upon removal of pressure from the controller handle 79 and to be turned in a counter-clockwise direction, so as to unseat the valve 73.

A plunger 86 is disposed in a suitable bore in the casing in line with the controller handle fulcrum pin 80 and has a stem extending through a suitable opening in the lever 78 and provided at its outer end with a button shaped head 87. A spring 88 is provided between a wall of the casing and the plunger 86.

The controller handle 79 has an extension 89 adapted to be disposed between the fulcrum pin 80 and the top surface of the plunger 86 for holding said plunger in the depressed position shown in the drawing, in which position the head 87 is free of the lever 78, so as to permit said lever to operate in a manner to be hereinafter described. The surface 90 of the controller handle extension 89 is arcuate shaped, the arc being formed by a radius extending from the center of the fulcrum pin 80. This permits vertical movement of the controller handle 79 and at the same time maintains the plunger 86 in the depressed position. When the controller handle is removed as shown in the drawing at the non-operating end of the equipment, the spring 88, which is stronger than the spring 84, urges the plunger 86 upwardly, causing the button shaped head 87 to engage lever 78 and hold it in the same position as it is held by the controller handle when said handle is depressed by the operator at the operating end of the car, as shown in the drawing.

When the plunger 86 is thus projected to its upper position, the space between said plunger and the controller handle fulcrum pin 80 is less than the thickness of the controller handle extension 89. However, the extension 89 is provided with a wedge-shaped end 91, which, when applying the controller handle to the device, is adapted to enter the space between the plunger 86 and pin 80 and displace said plunger and its head 87 downwardly to the position shown at the operating end of the car.

The sanding valve device 5 at each end of the car comprises a hollow casing containing a partition wall 92 having at one side a chamber 93 and at the opposite side a chamber 94. A check valve 95 is contained in chamber 93 and is adapted to engage a seat rib formed on said partition wall for closing communication between the chambers 93 and 94. The check valve 95 is connected by a stem 96 to a valve piston 97 operatively contained in chamber 94. A stem 98 on the valve piston 97 slidably projects through a suitable bore in the casing and is provided with a nut 99 adapted at one time to engage the casing, so as to limit the movement of said valve piston in unseating the check valve 95. A spring 100 is interposed between said valve piston and the partition wall 92 for normally maintaining valve piston 97 in the position shown in the drawing, in which the check valve 95 is seated.

The sanding reservoir control valve device 10 comprises a casing containing a diaphragm 101 and a double check valve 102 adapted to be operated by deflection of said diaphragm. The diaphragm 101 has a chamber 103 at one side connected by a pipe 104 to bore 28 in the brake control device, and a chamber 105 at the opposite side in communication with the atmosphere through a port 106 in the casing. The double check valve 102 is contained in a chamber 107 and has a stem 108 extending through a bore in the casing and engaging the diaphragm 101, the lower portion of said stem having sliding engagement in said bore while the upper portion of the stem is cut away to permit communication between chamber 107 and pipe 109 which is connected to the sanding valve device 5. The check valve 102 has a seat rib 110 on its lower face, which seat rib is adapted to engage a seal in the casing to close communication between chamber 107 and pipe 109, as shown in the drawing. The upper face of said check valve carries a seal adapted to engage a seat rib 111 formed in the casing, so as to close communication between chamber 107 and a fluid pressure supply pipe 112 which connects to the main reservoir 12.

The emergency release valve 6 comprises a casing having a chamber 154 containing a check valve 114 and a spring 115 for urging said valve into engagement with a seat rib 116 formed in the casing. Said check valve has a stem 117 projecting through the casing into engagement with a manually operable handle 118 which is fulcrumed on a pin 119 that is carried by a lug 120 projecting from the casing.

The circuit breaker device 7 comprises a casing having a chamber containing a piston 121 and a spring 122 acting on said piston. The piston is provided with a rod 123 which extends through a bore in the casing wall and is adapted to operate a circuit breaker (not shown) for opening the power circuit on a car.

The double check valve device 8 comprises a casing containing a double beat check valve 124 having a chamber 125 at one side and a chamber 126 at the opposite side. The check valve 124 is provided with a seat rib 127 in one end which is adapted to effect a leak proof seal with a gasket 128, and said check valve has a seat rib 129 on the opposite side which is adapted to effect a leak proof seal with a gasket 130.

The cut-off valve device 9 comprises a casing containing a piston 131 having a chamber 132 at one side, and a valve piston 133, operatively connected to said piston by a stem 134 and having a chamber 135 at the opposite side. A chamber 136 is formed between the piston 131 and valve piston 133 and extending into said chamber from the casing is a spring seat 137 between which and the piston 131 is interposed a spring 138 for normally maintaining said piston and valve piston in the position shown in the drawing.

In operation, fluid under pressure is supplied to the main reservoir 12 in the usual manner and flows therefrom through pipe 112 to valve chamber 72 in the power controller device 4 at each end of the car, and to the application valve chamber 22 of the brake control device 1. At the non-operating end of the car, on which the controller handle 79 is removed, the spring 88 acting on the plunger 86 causes the button shaped head 87 to engage and maintain the lever 78 in a position in which the valve 73 is seated by spring 74. At the operating end of the car, the valve 73 is also seated when the controller handle is depressed. If, however, the operator desires to depress lever 66 by applying foot pressure to the portion 70 of said pedal and thereby deflect the diaphragm 58 into engagement with seat rib 62, the controller handle need not be depressed, in which case the spring 84 urges the plunger stem 82 downwardly, causing lever 78 to rotate in a counter-clockwise direction, as well as causing the controller handle 79 to be rotated upwardly in the same direction. This movement of the lever 78 moves the piston 76 upwardly, lapping the passage 77 and unseating the valve 73, which permits fluid under pressure to flow from valve chamber 72 past valve 73 and through pipe 139 to diaphragm chamber 61 in the safety control device 3.

At the non-operating end of the car, the spring 48 in the foot operated plunger device 2 maintains the plunger 45 in the position shown in the drawing, in which position the lever 49 and operating rod 52 are so positioned as to permit lever 42 of the brake control device 1 to be in release position. Normally, that is when the brakes are released, there is no foot pressure applied to head 47 of the plunger 45 at the operating end of the car, which permits spring 48 to operate said plunger and lever 49 to shift the operating rod 54 to the right and rotate lever 55 to release position in which said lever may just engage the lever 42 of the brake control device 1, when the lever 42 is in release position.

When the brake control device is in release position, the chamber 16 is at atmospheric pressure and the diaphragm 14 is operated to the position shown in the drawing in which the brake cylinder 13 is open to the atmosphere through pipe 149, valve chamber 19 and a port 150. Since the diaphragm chamber 15 communicates with chamber 19 through the bore 29 in the sleeve-like member 27, said chamber is also normally at atmospheric pressure. With the brake control device 1 in release position, as will be hereinafter more fully described, the application valve 21 is seated by spring 24.

Normally, diaphragm chamber 103 of the sanding reservoir control valve device 10 is open to the atmosphere through pipe 104, bore 28 in the brake control device 1 and a port 151 in the casing. This permits the double check valve 102 to seat in its lower position by gravity, which opens communication between the fluid pressure supply pipe 112 and the sanding reservoir 11 by way of valve chamber 107 and pipe 152, and thereby permits the sanding reservoir to charge with fluid under pressure.

If it is desired to effect an application of the brakes, the operator applies foot pressure to the button 47 of the plunger 45 and moves said plunger downwardly against the resistance of spring 48. This movement of the plunger 45 rotates the lever 49 in a clockwise direction, thereby causing the operating rod 54 to rotate the lever 55 in a counter-clockwise direction. Since the lower end of lever 55 engages the upper end of the brake control device lever 42, which is free to rotate from release position in a clockwise direction, due to the slotted construction of the end of the operating rod 52, the rotation of said lever 55 causes the lever 42 to rotate in a clockwise direction about the fulcrum formed at its lower end in the bracket 41.

The clockwise rotation of the brake control device lever 42 moves the plunger 35 inwardly of the casing, which movement is transmitted through spring 40 and the diphragm follower 37 to diaphragm 14. The diaphragm 14 is thereby deflected to the right and acts through the follower 17 and stem 18 to shift the exhaust valve 20, so as to lap the exhaust port 150. Further deflection of the diaphragm causes the follower stem 18 to engage the stem 23 of the application valve 21 and unseat said valve against the pressure of spring 24.

With the application valve 21 unseated, fluid under pressure is permitted to flow from the main reservoir 12 through the fluid pressure supply pipe 112 and application valve chamber 22 to chamber 19 of the control valve device and from thence through pipe 149 to the brake cylinder 13, to apply the brakes, and also from chamber 19 through the bore 29 in the sleeve-like member 27 to diaphragm chamber 15. When the pressure of fluid thus supplied to the brake cylinder 13 and acting in chamber 15 on diaphragm 14 becomes slightly greater than the pressure of the diaphragm operating spring 40, the diaphragm is deflected to the left, which pulls the follower stem 18 out of engagement with the application valve stem 23 and permits the application valve 21 to seat, so as to prevent further flow of fluid under pressure to the brake cylinder 13.

It will be noted that in applying the brakes as just described, the pressure obtained in the brake cylinder 13 is governed by the pressure of the brake control device spring 40 which in turn is governed by the degree of rotation of lever 42, as effected by the degree of depression of the foot operated plunger 45. If the plunger 45 is fully depressed, at which time the cover 36 on the plunger 35 engages the casing of the brake control valve device 1, the spring 40 is compressed its maximum amount, which necessitates obtaining a fluid pressure in diaphragm chamber 15 slightly exceeding the pressure of spring 40 in order to effect a lap of the brakes, however, if the plunger 45 is depressed a less amount, a correspondingly less degree of fluid pressure is required in diaphragm chamber 15 to lap the brakes. It will further be noted that after a partial application of the brakes is effected in the manner above described, if it is desired to increase the brake cylinder pressure, the plunger 45 may be depressed further. This causes a further compression of spring 40 which operates the diaphragm 14 and application valve 21 in the same manner as hereinbefore described, to increase the pressure in the brake cylinder 13 an amount corresponding to the increased depression of the plunger 45. In this manner the brakes may be graduated on in steps if desired.

To release after an application of the brakes, the operator relieves the pressure of his foot from the plunger button 47 and permits the spring 48 to return the plunger 45 to its normal position. The movement of plunger 45 to its normal position operates lever 49 and rod 54 to rotate the lever 55 in a clockwise direction to release position, thereby relieving the pressure of said lever on the upper end of lever 42. This permits spring 40 to expand, returning lever 42 to its normal position and permitting brake cylinder pressure in diaphragm chamber 15 to deflect diaphragm 14 to its left hand position, thereby operating the exhaust slide valve 20 to release position in which the port 150 is uncovered to permit venting of fluid under pressure from the brake cylinder to the atmosphere by way of pipe 149, valve chamber 19 and said port. At the same time, fluid under pressure is vented from the diaphragm chamber 15 through chamber 19 and port 150.

If it is desired to graduate the release after an application of the brakes, the operator's foot pressure is partly relieved on the plunger button 47, which permits a partial expansion and decrease in pressure of the spring 40 in the brake control device 1. The brake cylinder pressure in diaphragm chamber 15 then being greater than the reduced pressure of spring 40 deflects the diaphragm 14 and operates the exhaust valve 20 to release position in which the pressure of fluid in brake cylinder 13 and in the diaphragm chamber 15 is permitted to reduce in the same manner as hereinbefore described. When the pressure in diaphragm chamber 15 is thus reduced slightly below the reduced pressure of spring 40, said spring operates to deflect diaphragm 14 to the right and operate slide valve 20 to lap position, in which the exhaust port 150 is closed to prevent further reduction in brake cylinder pressure. In this manner the brake cylinder pressure may be reduced in steps corresponding to the degree of relief of foot pressure upon the plunger 45.

It has been hereinbefore pointed out that when operating the car, the operator must either maintain the controller handle 79 depressed or the foot pedal 66 depressed, for reasons which will now be explained.

Assume the controller handle 79 not depressed, in which case the valve 73 is unseated and fluid under pressure is permitted to flow from the supply pipe 112 to pipe 139 which is connected to chamber 61 in the safety control device 3. With the foot pedal 66 depressed, the diaphragm 58 is pressed into sealing engagement with seat rib 62, so as to prevent flow of fluid under pressure from the chamber 61.

With the controller handle 79 and foot pedal 66 in the condition just described, if for any reason, such as incapacitation of the operator, the pressure of the operator's foot is removed from the foot pedal 66, the spring 71 rotates said pedal in a counter-clockwise direction. This relieves the manual pressure acting on the diaphragm 58 and permits the pressure of fluid in chamber 61 to deflect said diaphragm away from the seat rib 62. Fluid under pressure is thereby permitted to flow from chamber 61 through the safety control passage and pipe 143 to chamber 125 in the double check valve device 8. The chamber 126 in the double check valve device is connected to the atmosphere at the non-operating end of the car by way of pipe 143, past the unseated foot valve diaphragm 58, through pipe 139, past the controller valve stem 75 and through the atmospheric port 77, which permits the check valve 124 to be shifted to the position shown in the drawing and allow fluid under pressure to flow to pipe 141, from whence it flows through chamber 135 in the cut-off valve device 9 and pipe 140 to diaphragm chamber 16 in the brake control device 1. The pressure of fluid in the diaphragm chamber 16 deflects the diaphragm 14 to the right, which shifts the exhaust valve 20 to lap the exhaust port 150 and at substantially the same time unseats the application valve 21, so as to supply fluid under pressure to the brake cylinder 13 and effect an emergency application of the brakes.

When the diaphragm 14 in the brake control device is operated to apply the brakes by the pressure of fluid in chamber 16, the deflection of the diaphragm 14 is not limited as when deflected, due to the manual operation of the foot operated plunger device 2, and the greater deflection of the diaphragm 14 causes the follower member 17 to engage the end of the valve extension 31 and shift the member 27 to the right, which causes the atmospheric port 151 to be lapped by the packing cup 32 and flange 30 and at substantially the same time unseats the valve 26. Unseating of the valve 26 permits fluid at brake cylinder pressure to flow from chamber 19 to bore 28, from whence it flows through pipe 104 to diaphragm chamber 103 of the sanding reservoir control valve device 10. The pressure of fluid thus supplied to chamber 103 deflects the diaphragm 101 upwardly, which shifts the double beat valve 102 to its upper position into engagement with the seat rib 111. This cuts off the supply of fluid under pressure from pipe 112 to the sanding reservoir 11 and permits fluid under pressure to flow from said reservoir through pipe 152, past valve 102 and through pipe 109 to chamber 94 in the sanding valve device 5, at each end of the car.

Fluid under pressure supplied through pipe 143 for operating the brake control device 1 in the manner hereinbefore described, also flows to the outer face of valve piston 97 in the sanding valve device 5 at the operating end of the car and causes said valve piston to operate and unseat the check valve 95, which permits fluid under pressure from the sanding reservoir 11 to flow from chamber 94 to chamber 93 and from thence through pipe 153 to the sand trap (not shown) at the operating end of the car, which sand trap is thereby operated in the usual well known manner to sand the track rails.

It will be noted that fluid under pressure is supplied from the sanding reservoir 11 to the sand valve device 5 at both ends of the car, but only the sand valve device at the operating end of the car is operated to supply fluid for operating the sand trap.

When the safety control device 3 operates upon removal of foot pressure from the pedal 66, fluid under pressure also flows from chamber 61 past the diaphragm 58 to pipe 144 connecting to the chamber 145 of the circuit breaker device 7. The pressure of fluid thus supplied to said chamber causes the piston 121 to shift the piston rod 123 outwardly to operate the circuit breaker (not shown), for opening the power circuit.

In order to release after an application of the brakes effected by relieving the pressure on the pedal 66, the pedal 66 is first depressed, so as to deflect diaphragm 58 into engagement with the seat rib 62 and cut off the supply of fluid under pressure to pipe 143. The operator then unseats the valve 114 in the emergency release valve device 6 by pressing down on the handle 118. With the valve 114 unseated, fluid under pressure is vented from the brake control valve diaphragm chamber 16 to the atmosphere by way of pipe 140, cut-off valve chamber 135, pipe 141, valve chamber 154 in the emergency release valve 6, past the unseated valve 114 and through the atmospheric passage 155. As the pressure in the diaphragm chamber 16 is thus reduced, the opposing pressure in chamber 15 deflects the diaphragm 14 to the left to permit the application valve 21 to seat and cut off the supply of fluid under pressure to the brake cylinder 13, and to operate the exhaust valve 20 to uncover the port 150 to permit venting of fluid under pressure from the brake cylinder to effect a release of the brakes. As the diaphragm follower 17 is moved to the left by deflection of diaphragm 14, the spring 34 acting on the flange 30 of the member 27 shifts the valve 26 into engagement with its seat, in which position the port 151 is uncovered and permits venting of fluid under pressure from diaphragm chamber 103 of the sanding reservoir control valve device 10. With the diaphragm chamber 103 at atmospheric pressure, the double check valve 102 is permitted to drop by gravity into sealing engagement with its lower seat and thereby open communication from the sanding reservoir 11 to the fluid pressure supply pipe 112 for permitting said reservoir to recharge with fluid under pressure.

As fluid under pressure is vented from the brake control valve device 1 to the atmosphere by way of pipe 141 and the emergency release valve device 6, fluid under pressure is also vented from the circuit breaker cylinder 145 through pipe 144, pipe 143, chamber 125 in the double check valve device 8 and pipe 141, which permits the circuit breaker piston 121 to be returned to its normal position by the action of spring 123. The circuit breaker may then be operated to close the power circuit on the car.

The outer face of valve piston 97 in the sanding valve device 5 being connected to pipe 143, which is in communication with the atmosphere through the emergency release valve device 6, is also opened to the atmosphere which permits the spring 100 to shift said valve piston outwardly and seat the check valve 95.

The check valve 95 in the sanding valve device 5 is provided for preventing flow of fluid under pressure from chamber 93 to pipe 109 leading to the non-operating end of the car, when a hand operated sanding control valve device 156 is operated to supply fluid under pressure for sanding the track rails. This valve device 156 is provided for effecting the sanding of the track rails at any time the operator may desire, such as when the brakes are applied due to the operation of the foot operated plunger device 2. This device 156 comprises a casing containing a plug valve 157 operable to two different positions by a handle 158. A port 159 in the plug valve 157 is ineffective in the closed position shown in the drawing, but when the plug valve is turned 90°, the port 159 provides a connection from the fluid pressure supply pipe 112 to the sand trap pipe 153 to permit fluid under pressure to flow to the sand trap for supplying sand to the track rails.

As hereinbefore mentioned, when operating the car with the brakes released either the controller handle 79 or the pedal 66 must be maintained in a depressed position. If the controller handle is not depressed the pressure is removed from the pedal 66, an emergency application of the brakes is effected in the manner above described. If the controller handle 79 is depressed and the pedal 66 is not depressed and the operator removes the pressure from the controller handle 79, the plunger spring 84 operates to unseat the valve 73, which permits fluid under pressure to flow from the fluid pressure supply pipe 112 to pipe 139 and from thence through the safety control device 3 to safety control pipe 143, which is permitted by the diaphragm 58 being out of engagement with the seat rib 62 when the pedal 66 is not depressed. Fluid under pressure thus supplied to the safety control pipe 143 causes an emergency application of the brakes to be effected, the track rails to be automatically sanded and the circuit breaker device 7 to be operated in the same manner as when effected upon removal of pressure from the foot pedal 66. To release an application of the brakes effected in this manner, either the controller handle 79 on pedal 66 may be depressed and then the emergency release valve 6 is operated in the same manner as hereinbefore described.

The piston chamber 132 of the cut-off valve device 9 is connected to the same pipe 149 as the brake cylinder 13 is connected to, so that the cut off valve piston 131 is always subjected to brake cylinder pressure when an application of the brakes is effected. If the brake cylinder pressure obtained, when the brakes are applied by operation of the foot operated plunger device 2, exceeds a predetermined pressure, such as thirty-five pounds, this pressure acting on the cut-off valve piston 131 operates said piston against the opposing pressure of spring 138 and causes the valve piston 133 to move and engage a seat rib 160, so as to close communication between pipes 141 and 149. The controller handle 79 or pedal 66 may then be relieved of pressure and although they are operated in the same manner as hereinbefore described to supply fluid under pressure to pipe 141, an emergency application of the brakes is not effected, since fluid under pressure cannot flow to diaphragm chamber 16 of the brake control device 1.

Under certain conditions it may be desirable to always obtain an emergency application of the brakes upon removal of pressure from either the controller handle 79 or pedal 66, in which case the cut-off valve device 9 may be removed from the equipment and pipe 141 be connected directly to pipe 140. With these pipes connected, if the controller handle 79 or pedal 66 is permitted to operate to apply the brakes, fluid under pressure will be supplied to diaphragm chamber 16 of the brake control device 1 and operate said device to apply the brakes in emergency in the same manner as hereinbefore described and irrespective of the degree of pressure that may already be in the brake cylinder 13 and effective in diaphragm chamber 16 of the brake control device 1.

If the operator desires to operate the brakes from the opposite end of the car, the controller handle 79 is depressed to permit valve 73 to seat and the plunger 45 is depressed to apply the brakes. After the brakes are thus applied, pressure is removed from the plunger 45, permitting spring 48 to return said plunger to release position and initiate a release of the brakes. However, before the brakes are thus fully released, manual pressure on the controller handle 79 is partly relieved, which permits spring 84 to move the handle 79 upwardly and at the same time operate lever 78 to unseat the valve 73. Unseating of the valve 73 permits fluid under pressure to flow to the diaphragm chamber 16 of the brake control device and apply the brakes in the same manner as in emergency. Full main reservoir pressure is prevented from developing in the chamber 16, however, because when a safe brake cylinder pressure is thus obtained, the operator pulls the controller handle 79 from the power control device, which permits spring 88 to shift the plunger 86 upwardly and cause the button shaped head 87 to engage the lever 78 and operate it, so as to permit valve 73 to seat and cut off further flow of fluid under pressure to diaphragm chamber 16 of the brake control device.

If the brake cylinder pressure obtained by operation of the plunger 45 is sufficient to operate the cut-off valve device 9, then when the plunger 45 is released and the controller handle is operated to apply the brakes as above described, fluid under pressure is prevented from flowing to the diaphragm chamber 16 until the brake cylinder pressure has reduced sufficiently to permit the pressure supplied by operation of the controller handle to chamber 135 of the cut-off valve device to overcome the brake cylinder pressure acting in chamber 132 on the cut-off valve piston. When this occurs, the cut-off valve is operated to permit fluid under pressure to flow to the diaphragm chamber 16 as above described. It will be noted that the brakes are not completely released by the operation of the plunger 45 to release position, but the brake cylinder pressure reduces just sufficiently for the cut-off valve to operate, so as to permit flow of fluid under pressure to the brake control device for operating said device to apply the brakes as in emergency.

When a partial emergency application of the brakes is effected when changing operating ends of the car, as above described, it is undesirable to have the sanding valve device 5 operate to sand the track rails, and the circuit breaker device 7 operate to open the motor circuit, as when an emergency application occurs. To prevent the operation of the sanding valve device and circuit breaker device under this condition, the spring 100 in the sanding valve device and the spring 122 in the circuit breaker device are of such strength as to require emergency pressure to operate the pistons 97 and 121, respectively, which pressure exceeds that required to hold the car when changing ends.

After the controller handle 79 is removed from the power control device at what was previously the operating end of the car, it is applied to the power control device at the opposite end and either it or the pedal 66 is depressed. The emergency release valve device 6 is then operated to release the brakes after which the brakes are adapted to be controlled from what was formerly the non-operating end of the car.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a main reservoir and a brake cylinder, of a valve device comprising an abutment having a chamber at one side, manually controlled means for supplying fluid under pressure to said chamber for operating said abutment to supply fluid under pressure from said main reservoir to said brake cylinder to effect an application of the brakes, and manually controlled means for mechanically operating said abutment for supplying fluid under pressure from said main reservoir to said brake cylinder to effect an application of the brakes.

2. In a fluid pressure brake equipment, the combination with a main reservoir and a brake cylinder, of a valve device comprising an abutment having a chamber at one side, safety control means for supplying fluid under pressure to said chamber for operating said abutment to supply fluid under pressure from said main reservoir to said brake cylinder to effect an application of the brakes, and a spring subject to manual pressure for also operating said abutment to supply fluid under pressure from said main reservoir to said brake cylinder for effecting an application of the brakes.

3. In a fluid pressure brake equipment, the combination with a main reservoir and a brake cylinder, of a valve device comprising an abutment having a chamber at one side, means operative upon the relief of manual pressure to supply fluid under pressure to said chamber to operate said abutment to supply fluid under pressure from said main reservoir to said brake cylinder to effect an application of the brakes, and other means controlled by manual pressure for supplying fluid under pressure to said chamber to operate said abutment for supplying fluid under pressure from said main reservoir to said brake cylinder.

4. In a fluid pressure brake equipment, the combination with a main reservoir and a brake cylinder, of a valve device operative to supply fluid under pressure from said main reservoir to said brake cylinder to effect an application of the brakes, means operative by fluid under pressure upon the relief of manual pressure for supplying fluid under pressure from said main reservoir to said valve device for operating said valve device, and means operative by manual pressure for also operating said valve device.

5. In a fluid pressure brake equipment, the combination with a main reservoir and a brake cylinder, of an application valve for supplying fluid under pressure from said main reservoir to said brake cylinder, an abutment for operating said valve and having a chamber at one side, a spring pressed plunger contained in said chamber for operating said abutment, a lever for controlling the pressure of said spring, and a valve device for supplying fluid under pressure to said chamber for also operating said abutment.

6. In a fluid pressure brake equipment, the combination with a main reservoir and a brake cylinder, of an application valve adapted when unseated to supply fluid under pressure from said main reservoir to said brake cylinder, a release valve for venting fluid under pressure from said brake cylinder, an abutment for operating said valves and having a chamber at one side in communication with said brake cylinder, and having a chamber at the opposite side, a manually controlled plunger for operating said abutment to unseat said application valve, and means operative upon relief of manual pressure for supplying fluid under pressure to the second mentioned chamber for also operating said abutment to unseat said application valve.

7. In a fluid pressure brake equipment, the combination with valve mechanism for controlling the brakes on a car and for controlling the sanding of the track rails, of an abutment for operating said mechanism and having a chamber at one side, manually controlled means engaging said abutment for operating said valve mechanism to apply the brakes, and manually controlled means for supplying fluid under pressure to said chamber for causing said abutment to operate said valve mechanism to apply the brakes and to effect the supply of fluid under pressure for sanding the track rails.

8. In a fluid pressure brake equipment, the combination with valve mechanism for controlling the brakes on a car and for controlling the sanding of the track rails, of an abutment for operating said mechanism, a plunger operative upon depression to cause said abutment to operate said valve mechanism to apply the brakes, and means operative upon the relief of manual pressure for causing said abutment to operate said valve mechanism to apply the brakes and supply fluid under pressure for sanding the track rails.

9. In a fluid pressure brake equipment, the combination with valve mechanism for controlling the brakes on a car and for controlling the sanding of the track rails, of an abutment for operating said mechanism and having a chamber at one side, a plunger operative when depressed by an operator's foot to cause said abutment to operate said valve mechanism to apply the brakes, and valve means operative upon relief of manual pressure for supplying fluid under pressure to said chamber for causing said abutment to operate said valve mechanism to apply the brakes and supply fluid under pressure for sanding the track rails.

10. In a fluid pressure brake, the combination with a main reservoir, of a valve device operative to supply fluid under pressure for sanding the track rails, a sand reservoir, valve means for controlling the supply of fluid under pressure from said main reservoir to said sand reservoir and from said sand reservoir to said valve device, a reservoir to said brake cylinder and for controlling the operation of said valve means, and manu-reservoir to said brake cylinder and for controlling the operation of said valve means, and manually controlled means operative to supply fluid under pressure from said main reservoir to said valve mechanism for operating said valve mechanism and to said valve device for operating said valve device.

11. In a fluid pressure brake, the combination with a sand valve, of a sanding reservoir, a main reservoir, a valve for at one time supplying fluid under pressure from said main reservoir to said sand reservoir and for at another time venting fluid under pressure from said sand reservoir to said sand valve, a valve device for controlling the brakes and said valve, and control means operative upon the relief of manual pressure for supplying fluid under pressure to said sand valve for operating same and to said valve device for applying the brakes and for operating said valve to connect said reservoir to said sand valve for supplying fluid under pressure for sanding the track rails.

12. In combination, a device for controlling the brakes on a car and the sanding of the track rails, comprising an abutment having a chamber at one side, a brake release valve, a brake application valve and a sanding control valve mounted in said chamber and operatively controlled by said abutment, a manually controlled spring-pressed plunger disposed in a chamber at the opposite side of said abutment for at one time controlling the operation of said release valve and said application valve, and manually controlled fluid pressure means for at another time controlling the operation of said release valve, said application valve and said sanding control valve.

13. In combination, a device for controlling the brakes on a car and the sanding of the track rails, comprising an abutment having a chamber at one side, a brake release valve, a brake application valve and a sanding control valve mounted in said chamber and successively operative by said abutment, a spring-pressed plunger for operating said abutment, means for limiting the movement of said spring-pressed plunger, and means for supplying fluid under pressure to a chamber at the opposite side of said abutment for causing said abutment to successively operate said valve independently of said plunger.

14. A device for controlling the brakes on a car and the sanding of the track rails comprising a casing having a chamber containing a brake release valve, a brake application valve and a sanding control valve, of a diaphragm mounted in said casing, a diaphragm follower disposed in said chamber and operatively connected to said diaphragm and carrying said brake release valve, said diaphragm having a chamber at the opposite side adapted to be supplied with fluid under pressure for deflecting said diaphragm to operate said valves, and a spring for operating said brake application valve, and a spring for operating said sanding control valve upon release of the fluid pressure acting on said diaphragm.

15. In a fluid pressure brake, the combination with a brake cylinder and a valve device subject at all times on one side to fluid at the pressure in said brake cylinder and operative by fluid under pressure supplied to the opposite side to supply fluid under pressure to said brake cylinder to effect an emergency application of the brakes, of valve means normally subject to manual pressure and operative upon the relief of manual pressure to supply fluid under pressure to said opposite side for operating said valve device.

16. In a fluid pressure brake, the combination with a brake cylinder and a valve device subject at all times on one side to fluid at the pressure in said brake cylinder and operative by fluid under pressure supplied to the opposite side to supply fluid under pressure to said brake cylinder to effect an emergency application of the brakes, of a safety control pipe connected to said valve device, and valve means normally maintained depressed by an operator and operative upon the relief of pressure to supply fluid under pressure through said safety control pipe to said opposite side of said valve device.

17. In a fluid pressure brake, the combination with a brake cylinder and a valve device subject at all times on one side to fluid at the pressure in said brake cylinder and operative by fluid under pressure supplied to the opposite side to supply fluid under pressure to said brake cylinder to effect an emergency application of the brakes, of a safety control pipe connected to said valve device, and a valve normally maintained closed by manual pressure and operative upon the relief of manual pressure to supply fluid under pressure through said safety control pipe to said opposite side of said valve device.

18. In a fluid pressure brake, the combination with a valve device operative to effect an emergency application of the brakes, a sanding valve device for controlling the flow of fluid under pressure for sanding the track rails and a circuit breaker device for opening a power circuit, of a safety control pipe, and a valve normally operative by the manual pressure of an operator to render said valve device, said sanding valve device and said circuit breaker device non-operating and operative upon the relief of manual pressure to supply fluid under pressure through said safety control pipe to operate said valve device, said sanding valve device and said circuit breaker device.

19. In a fluid pressure brake, the combination with a valve device for controlling the application and the release of the brakes, valve means normally subject to manual pressure and operative upon the relief of manual pressure to supply fluid under pressure to said valve device for effecting an application of the brakes, and other valve means operative to vent fluid under pressure from said valve device for effecting a release of the brakes when said first mentioned valve means is subject to manual pressure.

20. In a fluid pressure brake, the combination with a valve device for controlling the application and the release of the brakes, of a pair of cooperating, manually controlled valves operative when neither is subject to manual pressure to supply fluid under pressure to said valve device for effecting an application of the brakes and operative when either one or the other is subject to manual pressure to cut off the supply of fluid under pressure to said valve device, and a third manually controlled valve for venting fluid under pressure from said valve device to effect a release of the brakes.

21. In a fluid pressure brake, the combination with a valve device for controlling the application and the release of the brakes, of a foot controlled valve, a hand controlled valve cooperative with said foot controlled valve for governing the supply of fluid under pressure to said valve device for effecting an application of the brakes, and a manually operated valve for venting fluid under pressure from said valve device to effect a release of the brakes when either said foot controlled valve or said hand controlled valve is depressed by the operator.

22. In a fluid pressure brake, the combination with a valve device for controlling the application and release of the brakes, of a plunger device connected mechanically to said valve device for controlling the operation thereof, and a manually controlled valve operative independently of said plunger device for causing said valve device to be operated pneumatically to effect an application of the brakes.

23. In a fluid pressure brake, the combination with a valve device for controlling the application and release of the brakes, of a plunger device connected mechanically to said valve device for controlling the operation thereof, and a valve for supplying fluid under pressure to operate said valve device to apply the brakes, the operation of said plunger device and said valve being controlled by the same foot of an operator.

24. In a fluid pressure brake, the combination with a valve device for controlling the application and release of the brakes, of a plunger device connected mechanically to said valve device and operative upon depression by an operator's foot to operate said valve device to apply the brakes and upon the relief of pressure of the operator's foot to permit a release of the brakes, and a valve normally maintained closed by the pressure of the operator's foot and operative upon relief of foot pressure to supply fluid under pressure to said valve device for causing an application of the brakes to be effected.

25. In a fluid pressure brake, the combination with a valve device for controlling the application and release of the brakes, of a plunger device connected mechanically to said valve device and operative upon depression by an operator's foot to operate said valve device to apply the brakes and upon the relief of pressure of the operator's foot to permit a release of the brakes, and means normally maintained in a non-operating position by the pressure of an operator's foot and operative upon relief of foot pressure to cause said valve device to operate and apply the brakes.

26. In a fluid pressure brake, the combination with a brake control device operative to apply and release the brakes on a car, of a plunger device operative by pressure from the ball of an operator's foot to cause said brake control device to apply the brakes and upon the relief of such pressure to permit said brake control device to release the brakes, and a pedal device normally maintained non-operating by pressure from the heel of the operator's same foot and rendered operative to cause said brake control device to apply the brakes upon relief of said heel pressure.

27. In a fluid pressure brake, the combination with a valve device operative to apply the brakes, of a removable controller handle, valve means operated upon release of the controller handle for supplying fluid under pressure to operate said valve device, and a device operative upon removal of said handle for preventing the operation of said valve means.

28. In a fluid pressure brake, the combination with a valve device operative to apply the brakes, of a removable controller handle, valve means operated upon release of the controller handle for supplying fluid under pressure to operate said valve device, and a device operative when the controller handle is removed for rendering said valve means inoperative.

29. In a fluid pressure brake, the combination with a valve device operative to apply the brakes, of a removable controller handle, valve means operated upon release of the controller handle for supplying fluid under pressure to operate said valve device, and a device for preventing the operation of said valve means upon removal of the controller handle.

30. In a fluid pressure brake, the combination with a valve device operative to apply the brakes, of a removable controller handle, valve means operated upon release of the controller handle for supplying fluid under pressure to operate said valve device, a device tending to operate said valve means and normally held inoperative by said handle, and means for maintaining said device inoperative upon removal of said handle.

31. In a fluid pressure brake, the combination with a valve device controlled by variations in manual pressure for controlling the brakes on a car, of a mechanism at each end of the car operatively connected to said valve device and operated manually for varying the pressure on said valve device, the mechanism at the operating end of the car being adapted to control said valve device without operating the mechanism operatively connected to the valve device from the non-operating end of the car.

32. In a fluid pressure brake, the combination with a manually operated valve device for controlling the brakes on a car, of manually operated mechanism at each end of the car for controlling the operation of said valve device, and link-like means operatively connecting said mechanism to said valve device for controlling the operation of said valve device by the mechanism at either end of the car, said link-like means being arranged to permit operation of said valve device from one end of the car without operating the link-like means connecting said valve device to the mechanism at the opposite end of the car.

33. In a fluid pressure brake, the combination with manually operated valve device for controlling the brakes on a car, of a mechanism at each end of the car for controlling the operation of said valve device, a movable member operatively connecting the mechanism at one end of the car to said valve device, a movable member operatively connecting the mechanism at the other end of the car to said valve device, the connection between said movable members and said valve device being so arranged that the member connecting to the mechanism at one end of the car is immovable when said valve device is controlled by the mechanism at the opposite end of the car.

34. In a fluid pressure brake, the combination with a valve device for controlling the brakes on a car, a lever for operating said valve device, a foot operated mechanism at one end of the car, a rod connecting said mechanism to said lever, a foot operated mechanism at the opposite end of the car, a lever adapted to engage the first mentioned lever for operating same, a rod connecting the second mentioned mechanism to the second mentioned lever for operating the first mentioned lever and a lost motion connection between the first mentioned rod and first mentioned lever for permitting operation of the first mentioned lever by the second mentioned mechanism without operating the first mentioned mechanism.

35. In a fluid pressure brake, the combination with a valve device operative to effect an application of the brakes on a car, of a safety control device at each end of the car operative upon relief of manual pressure to supply fluid under pressure to said valve device to operate said valve device and operative by manual pressure to establish an atmospheric connection from said valve device, means operative at the nonoperating end of the car for maintaining said safety control device in the position for opening said atmospheric connection, and a double check valve device interposed in the connection between said valve device and the safety control device at each end of the car for closing communication from said valve device to the safety control device at the non-operating end of the car.

36. In a fluid pressure brake, the combination with a valve device operative to effect an application of the brakes on a car, of a safety control device at each end of the car having a removable handle at the operating end, said safety control device being operable upon relief of manual pressure on said handle to supply fluid under pressure to said valve device for operating said valve device and operable when said handle is depressed to cut off the supply of fluid under pressure to said valve device and to establish an atmospheric connection from said valve device, means for maintaining said safety control device in the position for maintaining said atmospheric connection upon removal of said handle at the non-operating end of the car, and a double check valve for closing communication from said valve device to said atmospheric connection at the non-operating end of the car.

37. In a fluid pressure brake, the combination with a brake cylinder, of a valve device operated by fluid under pressure for supplying fluid under pressure to said brake cylinder, manually operable means for supplying fluid under pressure to said valve device, and manually operable mechanical means for also operating said valve device to effect an application of the brakes.

FREMONT P. LIVINGSTON.